US009467835B2

(12) United States Patent
Hiben

(10) Patent No.: US 9,467,835 B2
(45) Date of Patent: Oct. 11, 2016

(54) PUBLIC SAFETY NETWORK RELAY SERVICE MANAGEMENT

(71) Applicant: MOTOROLA SOLUTIONS, INC, Schaumburg, IL (US)

(72) Inventor: Bradley M. Hiben, Glen Ellyn, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 115 days.

(21) Appl. No.: 14/290,596

(22) Filed: May 29, 2014

(65) Prior Publication Data
US 2015/0350859 A1 Dec. 3, 2015

(51) Int. Cl.
*H04W 88/04* (2009.01)
*H04W 4/22* (2009.01)
(Continued)

(52) U.S. Cl.
CPC .......... *H04W 4/22* (2013.01); *H04B 7/15507* (2013.01); *H04W 24/08* (2013.01); *H04W 40/22* (2013.01); *H04W 60/04* (2013.01); *H04W 88/04* (2013.01)

(58) Field of Classification Search
CPC ..... H04W 4/22; H04W 4/008; H04W 4/025; H04W 76/007; H04W 88/04; H04W 88/08; H04W 88/02; H04W 84/047; H04W 84/20; H04W 72/0406; H04W 8/005; H04W 40/22; H04W 40/02; H04W 40/12; H04W 40/42; H04W 40/246; H04W 40/248; H04W 40/26; H04W 40/28; H04W 40/30; H04W 40/32; H04W 84/18; H04B 7/14; H04B 7/15507; H04B 7/15592; H04B 7/15528; H04B 7/15542; H04B 7/2606
USPC .............. 455/404.1, 420, 421; 370/270, 274, 370/315, 340, 400
See application file for complete search history.

(56) References Cited

U.S. PATENT DOCUMENTS 5,768,683 A 6/1998 Mulford
7,646,754 B2 1/2010 McLaughlin et al.
(Continued)

FOREIGN PATENT DOCUMENTS

EP 1599973 B1 7/2010
WO 2005071992 A1 8/2005

OTHER PUBLICATIONS

Technical Report—3GPP TR 22.803 v12.2.0—(Release 12) 3rd Generation Partnership Project; Technical Specification Group Services and System Aspects; Feasibility study for Proximity Service(ProSe)—Jun. 2013.
(Continued)

*Primary Examiner* — Magdi Elhag

(57) ABSTRACT

A method and mobile device are provided that manage a relay service in a public safety wireless communication system. When the mobile device determines one or more of: another mobile device has exited or is exiting a public safety vehicle or another first mobile device is not receiving a signal from a wide area network of acceptable signal quality, the mobile device activates a relay service. In response to activating the relay service, the mobile device announces an availability of the relay service at the mobile device, receives a registration of the another mobile device for the relay service, and, in response to receiving the registration, relays communications between the another mobile device and an access node. In another embodiment, a method is provided for negotiating a provision of a relay service among multiple mobile devices, wherein each such mobile device currently is providing a relay service.

12 Claims, 6 Drawing Sheets

(51) Int. Cl.
*H04W 60/04* (2009.01)
*H04B 7/155* (2006.01)
*H04W 24/08* (2009.01)
*H04W 40/22* (2009.01)

(56) References Cited

U.S. PATENT DOCUMENTS

| | | |
|---|---|---|
| 7,742,425 B2 | 6/2010 | El-Damhoughy |
| 7,848,255 B2 | 12/2010 | Suzuki et al. |
| 7,969,914 B1 | 6/2011 | Gerber et al. |
| 8,027,259 B2 | 9/2011 | Westphal |
| 8,559,293 B2 | 10/2013 | Lin et al. |
| 2009/0116509 A1 | 5/2009 | Delaney |
| 2012/0122431 A1* | 5/2012 | Moon ............... H04M 1/7253 455/414.1 |
| 2013/0235758 A1 | 9/2013 | Delmas et al. |
| 2013/0279398 A1 | 10/2013 | Cha et al. |
| 2014/0018083 A1* | 1/2014 | Laraqui ............ H04W 84/042 455/446 |
| 2014/0133332 A1 | 5/2014 | Lee |
| 2014/0335791 A1* | 11/2014 | Kim ................... H04W 4/008 455/41.2 |
| 2014/0348061 A1* | 11/2014 | Salkintzis ......... H04W 4/008 370/328 |
| 2015/0029866 A1* | 1/2015 | Liao ................... H04W 4/008 370/241 |
| 2015/0043429 A1* | 2/2015 | Kim ................... H04W 4/008 370/328 |

OTHER PUBLICATIONS

NEC: "ProSe Relay", 3GPP Draft; S2-132557, 3rd Generation Partnership Project (3GPP), Mobile Competence Centre; 640, Route des Lucioles; F-06921 Sophia-Antipolis Cedex; France, vol. SA WG2, no Valencia, Spain; Jul. 15, 2013-Jul. 9, 2013, retrieved from the internet: URL:http://www.3gpp.org/ftp/tsg_sa/WG2_Arch/TSGS2_98_Valencia/Docs/, all pages.

The International Search Report and the Written Opinion, PCT/US2015/029017, filed: May 4, 2015, mailed: Oct. 5, 2015, all pages.

* cited by examiner

PUBLIC SAFETY NETWORK RELAY SERVICE MANAGEMENT

FIELD OF THE INVENTION

The present invention relates generally to the field of wireless communication systems, and more particularly, to management of a relay service in a public safety wireless communication network.

BACKGROUND OF THE INVENTION

Public safety (PS) wide-area communication networks (WANs) are known to use digital vehicular repeater system (DVRS) in order to increase system coverage. Such networks provide for the transfer of wireless communication between a base station (BS) and a public safety LTE (Long Term Evolution) handheld device (LEX) using an intermediate repeater. That is, the intermediate repeater provides a relay service between an LEX carried by public safety responders and a PS base stations.

There may be times, however, when a vehicle operated by a public safety responder when responding to an incident scene may not include a DVRS. In such an instance, when the public safety responder leaves the vehicle with his or her LEX, he or she may lose wireless network coverage from the incident scene, which could imperil the public safety responder should an emergency situation arise.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
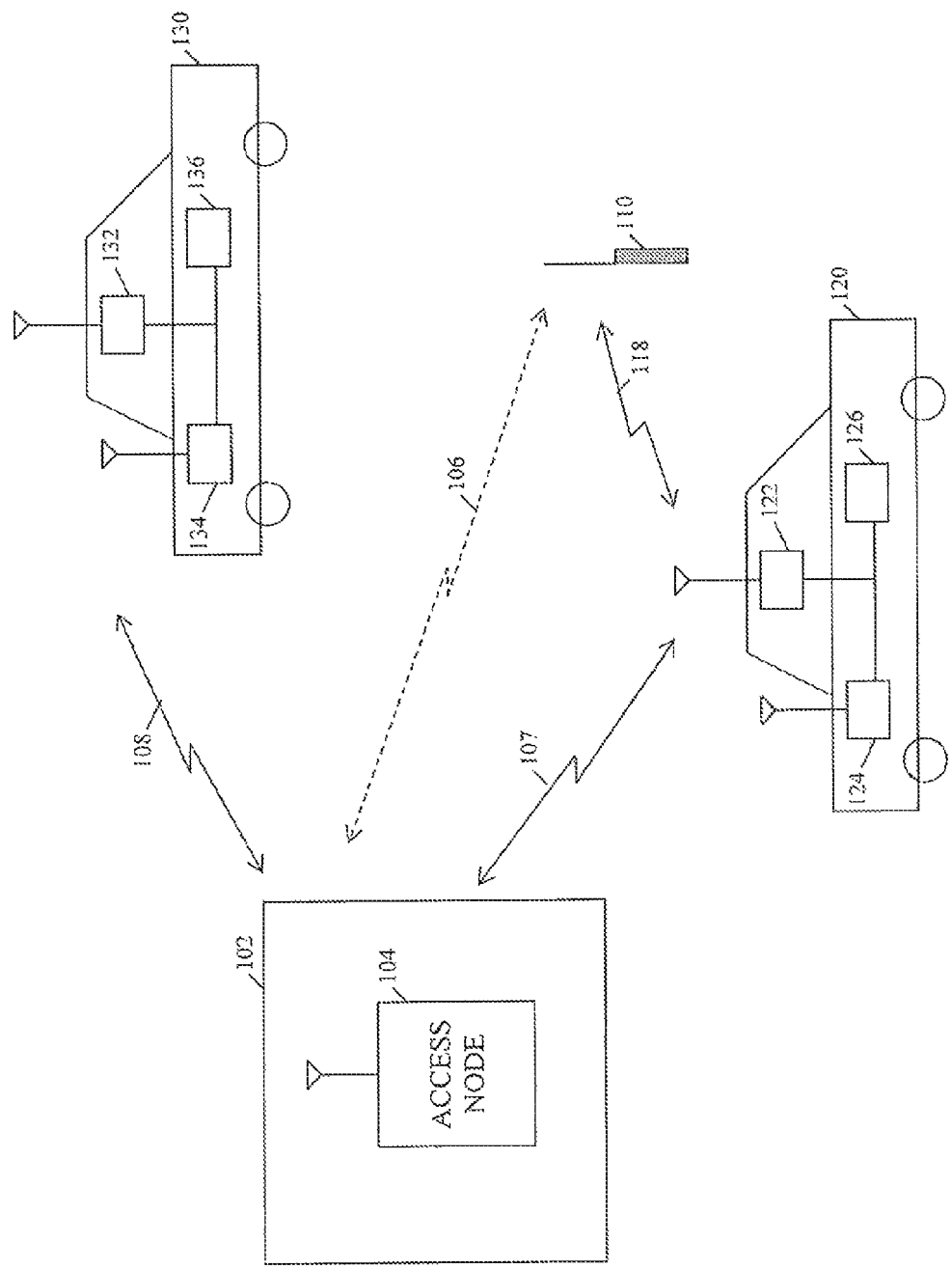
FIG. 1 is a block diagram of a wireless communication system in accordance with some embodiments of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION OF THE INVENTION

To address the need for improved wireless system coverage in a public safety wireless communication system, a method and mobile device are provided that manage a relay service in a public safety wireless communication system. When the mobile device determines one or more of: another mobile device has exited or is exiting a public safety vehicle or another first mobile device is not receiving a signal from a wide area network of acceptable signal quality, the mobile device activates a relay service. In response to activating the relay service, the mobile device announces an availability of the relay service at the mobile device, receives a registration of the another mobile device for the relay service, and, in response to receiving the registration, relays communications between the another mobile device and an access node. In another embodiment, a method is provided for negotiating a provision of a relay service among multiple mobile devices, wherein each such mobile device currently is providing a relay service.

Generally, an embodiment of the present invention encompasses a method for managing a relay service in a public safety wireless communication system. The method includes determining, at a second mobile device, one or more of: a first mobile device has exited or is exiting a public safety vehicle or the first mobile device is not receiving a signal from a wide area network of acceptable signal quality. The method further includes activating, at the second mobile device, a relay service; in response to activating the relay service, announcing, by the second mobile device, an availability of the relay service at the second mobile device; in response to announcing the availability of the relay service, receiving, by the second mobile device, a registration of the first mobile device for the relay service; and, in response to receiving the registration, relaying, by the second mobile device, communications between the first mobile device and an access node.

Another embodiment of the present invention encompasses a method for negotiating a provision of a relay service among a plurality of mobile devices in a public safety wireless communication system. The method includes activating, by a first mobile device of the plurality of mobile devices, a relay service provided by the first mobile device; discovering, by the first mobile device, a second mobile device of the plurality of mobile devices that provides a relay service; and de-activating, by one of the first mobile device and the second mobile device, the relay service provided by that mobile device.

Yet another embodiment of the present invention encompasses an apparatus for provision of a relay service in a public safety wireless communication system. The apparatus comprises a vehicular mobile mounted device (VML) that includes a first network interface that is configured to directly communicate with a mobile device and a second network interface that is configured to directly communicate with an access node. The VML further includes processor that is configured to determine one or more of: a mobile device has exited or is exiting a public safety vehicle or the mobile device is not receiving a signal from a wide area network of acceptable signal quality; activate a relay service at the VML; in response to activating the relay service, announce an availability of the relay service at the VML; in response to announcing the availability of the relay service, receive a registration of the mobile device for the relay service; and in response to receiving the registration, relay communications between the mobile device and an access node via the first and second network interfaces.

The present invention may be more fully described with reference to FIGS. 1-6. FIG. 1 is a block diagram of a public safety wireless communication system 100 in accordance with an embodiment of the present invention. Public safety system 100 includes a wide-area narrowband or broadband wireless network (WAN) 102. WAN 102 provides wireless services to multiple mobile devices, also known as user terminals, 122, 110, 132 (three shown) residing in a coverage area of the WAN via one or more access nodes 104 (one shown), such as a base station (BS), a Node B, an evolved NodeB (eNB), or an access point (AP).

In order to communicate with each other, each of WAN 102 and the multiple mobile devices 110, 122, 132 operates in accordance with a WAN wireless technology. For example, WAN 102 may be a 3GPP (Third Generation Partnership Project) network or a later generation 3GPP wireless network, such as a 3GPP LTE (Long Term Evolution) network, a Public Safety Narrowband (PSNB) network, a CDMA (Code Division Multiple Access) wireless network or a later generation CDMA wireless network, and so on. In various embodiments of the present invention, WAN 102 need not be a single network as illustrated, but could include multiple wireless networks interconnected by forwarding equipment. In such embodiments, one of the multiple mobile devices 110, 122, 132 may be served by a different wireless network of the multiple wireless networks and a different service provider of the one or more service providers than other mobile devices of the multiple mobile devices. For example, one of the multiple mobile devices 110, 122, 132 may be a broadband device that communicates with a broadband WAN, such as a Third Generation Partnership Project Long Term Evolution (3GPP LTE) network, and another of the multiple mobile devices 122, 110, 132 may be a narrowband device that communicates with a narrowband WAN, such as a Public Safety Narrowband (PSNB) network. In still other embodiments of the present invention, one or more of the multiple mobile devices 110, 122, 132 may be able to communication with WANs of multiple different technologies, such as both a 3GPP LTE WAN and a PSNB WAN.

As depicted in FIG. 1, each of mobile devices 110, 122, and 132 is served by access node 104. Access node 104 may directly communicate with a first mobile device 110 of the multiple mobile devices 110, 122, 132 via a first WAN wireless link 106, may directly communicate with a second mobile device 122 of the multiple mobile devices 110, 122, 132 via a second WAN wireless link 107, and may directly communicate with a third mobile device 132 of the multiple mobile devices 110, 122, 132 via a third WAN wireless link 108. Further, the first and second mobile devices 110, 122 may directly communicate with each other via a short range wireless link, for example, Bluetooth®, a wireless local area network (WLAN) protocol, or LTE-U, or may use an unused wireless resource of WAN 102.

A first mobile device 110 of the multiple mobile devices 110, 122, 132 is a handheld user device 110 that a public safety responder may carry with him or her upon exiting vehicle 120 or 130. For example, in various technologies, handheld user device 110 may be referred to as a mobile station (MS), a user equipment (UE), a remote device, a subscriber station, subscriber unit, a land mobile radio (LMR), an LTE public safety (PS) radio (LEX), and so on. The second and third mobile devices 122, 132 may be mobile devices that are each affixed to a corresponding public safety vehicle 120, 130, such as a laptop computer or a tablet computer with wireless capabilities, and that typically would not leave the vehicle, although may be is possible to detach mobile devices 122, 132 from their corresponding vehicles and use the mobile device outside of the vehicle. For example, the second and third mobile devices 122, 132 each may be a vehicular mobile mounted device (VML) (and referred to herein as VMLs), for example, a first VML 122 and a second VML 132.

Each of vehicles 120 and 130 further may include a respective GPS receiver 124, 134 in communication with a corresponding VML 122, 132 and that is capable of determining a geographical location of vehicle. Additionally, each of vehicles 120 and 130 may include one or more sensing devices 126, 136 that are in communication with corresponding VMLs 122, 132 and that detect an indication of whether a public safety responder, and correspondingly a handheld user device, such as handheld user device 110, is exiting or has exited the vehicle and provide such an indication to the corresponding VML. For example, the one or more sensing devices 126, 136 may include as a motion sensor that detects whether the vehicle is in motion or stopped (if the vehicle is in motion, that may indicate that the public safety responder and associated handheld user device are in the vehicle), a door sensor that detects whether a door is open (an open door may indicate that the public safety responder and associated handheld user device are about to leave the vehicle), a pressure sensor that detects whether a public safety responder is sitting in a car seat, and a video sensor that detects whether a public safety responder is in a field of view, that is, is inside or outside of the vehicle.

Figure 2:
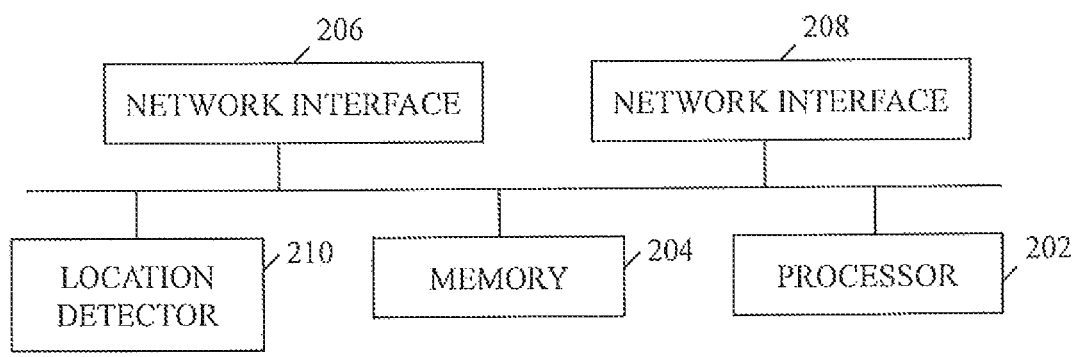
FIG. 2 is a block diagram of a mobile station capable of acting as a relay station in the communication system of FIG. 1 in accordance with some embodiments of the present invention.
Figure 3:
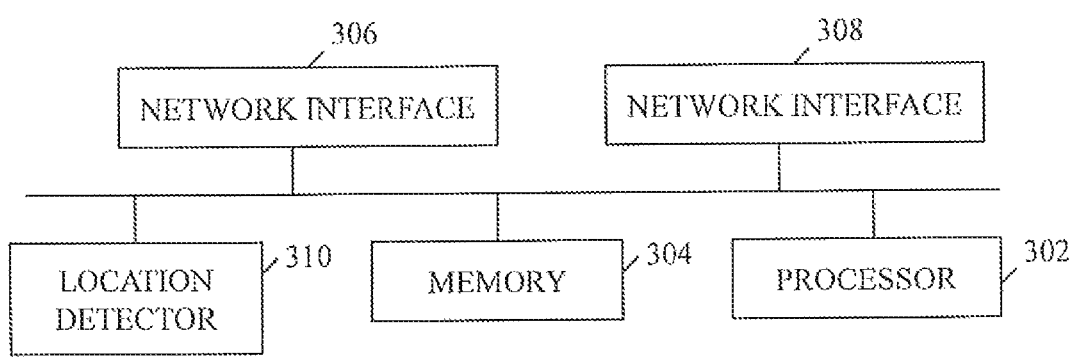
FIG. 3 is a block diagram of a mobile station of the communication system of FIG. 1 in accordance with some embodiments of the present invention.

Referring now to FIGS. 2 and 3, block diagrams are provided of each of a VML 200, such as VMLs 122 and 132, and a handheld user device 110 in accordance with some embodiments of the present invention. Each of VML 200 and handheld user device 110 operates under the control of a respective processor 202, 302 such as one or more microprocessors, microcontrollers, digital signal processors (DSPs), combinations thereof or such other devices known to those having ordinary skill in the art. Each processor 202, 302 operates the corresponding mobile device according to data and instructions stored in a respective at least one memory device 204, 304 such as random access memory (RAM), dynamic random access memory (DRAM), and/or read only memory (ROM) or equivalents thereof, that stores data and programs that may be executed by the corresponding processor so that the VML and handheld user device may perform the functions described herein. Each of the at least one memory devices 204, 304 further maintains a mobile device identifier, such as an international mobile equipment identity (IMEI), that may be used to uniquely identify the mobile device in communication system 100.

Each of VML 200 and handheld user device 110 further includes multiple network interfaces in communication with their corresponding processor. For example, VML 200 may include a first network interface 206 in communication with processor 202 and for directly communicating with another mobile device, such as handheld user device 110 or another VML, such as VMLs 122 and 132, via a short range wireless protocol, and a second network interface 208 in communication with processor 202 and for communicating with access node 104, for example, via a WAN protocol. Similarly, handheld user device 110 includes a first network interface 306 in communication with processor 302 and for communicating with another mobile device, such as VMLs 122 and 132, via a short range wireless protocol, and a second network interface 308 in communication with processor 202 and for communicating with access node 104, for example, via a WAN protocol. Each of the network interfaces 206, 208, 306, and 308, if a wireless interface, may include an RF receiver (not shown) and an RF transmitter (not shown). Additionally, each of VML 200 and handheld user device 110 may include a respective location detector 210, 310, such as a GPS receiver, in communication with their corresponding processor and that is capable of determining a geographical location of the VML or handheld user device. Unless otherwise specified herein, the functionality described herein as being performed by VMLs 122 and 132 and handheld user device 110 is implemented with or in software programs and instructions stored in the respective at least one memory device 204, 304 of the VML and handheld user device and executed by the associated processor 202, 302 of the VML and handheld user device.

When a public safety (PS) responder uses a vehicle 120, 130, such as a car or truck, to travel to an incident scene, the vehicle may include a mobile mounted device (VML), such as VMLs 122, 132 with higher transmitter power and antenna gain (for example, 1.2 W transmit power and 3 dBd antenna gain) than a handheld user device carried by the PS responder, such as handheld user device 110 (which handheld user device may have, for example, 200 mW transmit power and −13 dBd antenna gain). The PS responder may have good WAN coverage while using the VML, but may lose coverage when he or she leaves the vehicle because of the more limited (for example, 24 dB less) link margin of the handheld user device. Situations may arise where a digital vehicular repeater system (DVRS) may not be available to relay transmissions to/from the handheld user device to access node 104. In such instances, the loss of RF coverage at an incident scene by the PS responder's handheld user device could imperil the safety of the PS responder. Therefore, communication system 100 expands the coverage of the WAN wireless network by using a VML, such as VMLs 122 and 132, as a wireless relay for the handheld user device.

However, VML 122 does not always act as a relay. When a WAN signal from access node 104 is strong enough to provide acceptable coverage for handheld user device 110, then there is no need to activate a relay for the handheld user device so the VML need not initiate its relay service. Further, when VML 122 is moving, it may be inadvisable for the VML to act as a relay for the handheld user device because the VML may not be able to select a channel, band, or spectrum reliably and further because the VML may cause unwanted mobility events as handheld user device 110 attempts to relay a signal to access node 104 via the VML only to have the VML drive out of range momentarily.

Figure 4:
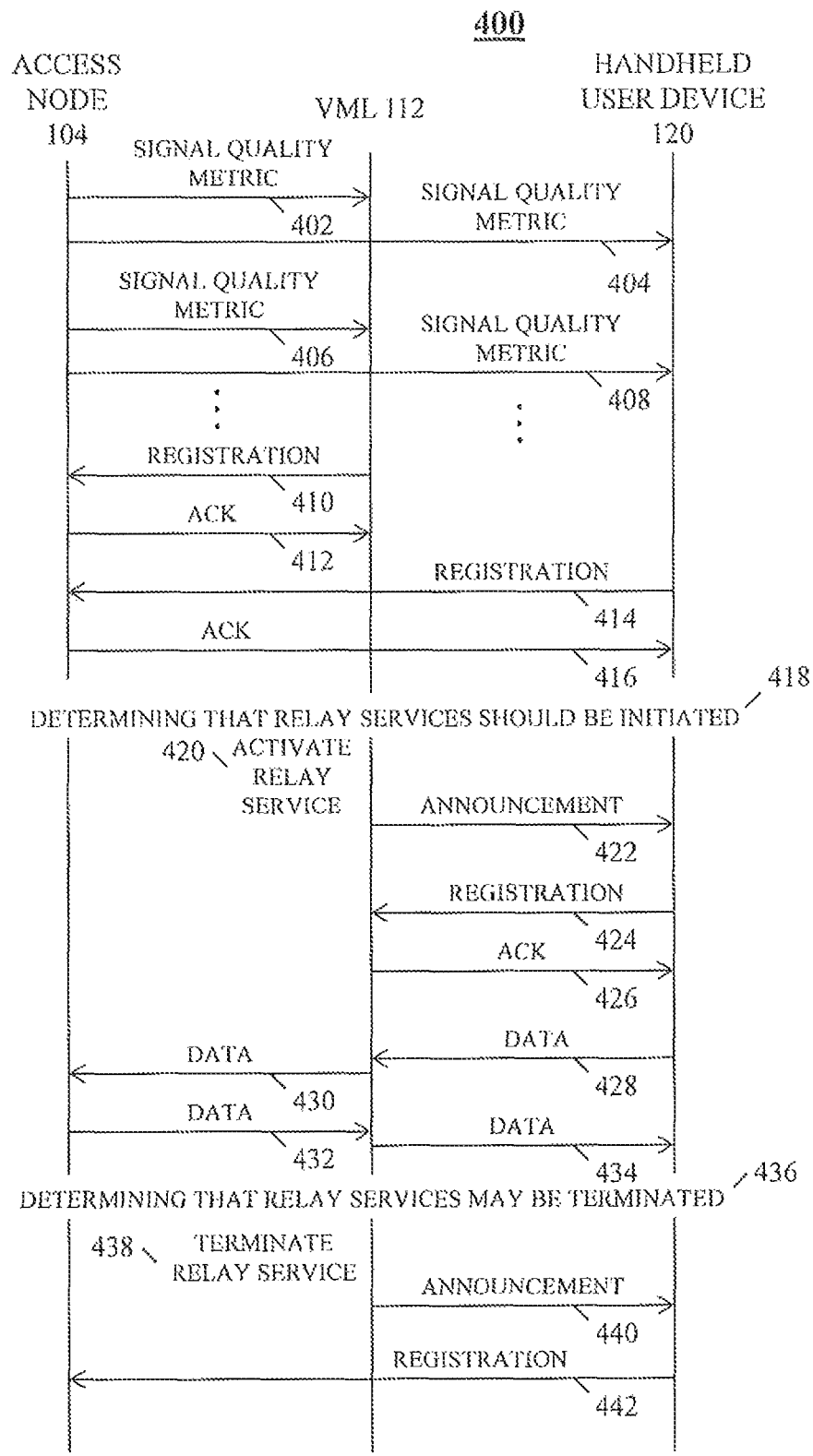
FIG. 4 is a signal flow diagram illustrating a method executed by communication system of FIG. 1 to dynamically establish a relay-based communication in accordance with some embodiments of the present invention.

Referring now to FIG. 4, a signal flow diagram 400 is provided that illustrates a method executed by communication system 100 to dynamically establish a relay-based communication in accordance with some embodiments of the present invention. Signal flow diagram 400 begins when each of a VML, such as VML 122, and handheld user device 110 monitors reference signals 402, 404, 406, 408, such as a pilot signal, transmitted by access node 104 and determines a signal quality metric associated with each monitored reference signal. Various signal quality metrics are known in the art and any such metric may be used herein, such as a signal strength, for example, a reference signal received power (RSRP) or a received signal strength indicator (RSSI), a signal-to-noise ratio (SNR), an energy per bit, various measures of interference, a use of retransmission requests, a modulation and coding scheme (MCS), a Quality of Service (QoS), a channel quality indicator (CQI), and so on.

At some point in time, each of the VML, that is, VML 122, and handheld user device 110 registers 410, 414 with the WAN via access node 104, for example, based on the determined signal quality metrics, in accordance with well known registration techniques. In response to a successful registration, access node 104 transmits a respective registration acknowledgement 412, 416 to each of VML 122 and handheld user device 110.

At some point in time after registering with WAN 102, VML 122 determines 420 that a relay service should be initiated. For example, in one embodiment of the present invention, VML 122 may determine to initiate its relay service in response to determining that the public safety responder, and corresponding handheld user device 110, is exiting, or has exited, vehicle 120. For example, a motion sensor of the one or more one or more sensing devices 126 may detect that vehicle 120 has stopped (if the vehicle is in motion, that may indicate that the public safety responder and associated handheld user device are in the vehicle, whereas if the vehicle has stopped that may indicate that the public safety responder is about to leave the vehicle), a door sensor of the one or more sensing devices may detect that a door of vehicle 120 is open (an open door may indicate that the public safety responder and associated handheld user device are about to leave the vehicle), a pressure sensor of the one or more sensing devices may detect that a public safety responder has left his or her car seat, or a video sensor of the one or more sensing devices may detect that the public safety responder is not in a field of view within the vehicle, or is in a field of view outside of the vehicle. Additionally, movement can detected by using location detectors of the VML 122 and handheld user device 110, wherein the handheld user device 110 may communicate its location to VML 122.

By way of another example, in another embodiment of the present invention, VML 122 may determine to initiate its relay service in response to self-determining that handheld user device 110 may not be receiving a signal from WAN 102, and in particular access node 104, of acceptable signal quality. For example, VML 122 may estimate a signal strength of WAN 102, that is, a strength of a signal received at VML 122 from access node 104, using a reference symbol received power from the WAN The VML then may compensate for the different antenna gain and transmitter power of a nearby handheld user device 110 (versus the antenna gain and transmitter power of the VML) to determine if the handheld user device will have sufficient signal strength to operate on the WAN or if the nearby handheld user device would be better served by the relay.

By way of another example, VML 122 may monitor signals exchanged between access node 104 and handheld user device 110 to determine whether the handheld user device is receiving a signal from access node 104 of acceptable signal quality. For example, VML 122 may monitor downlink signals of access node 104 that may include an uplink map (UL-MAP). From a monitored UL-MAP, the VML can identify a Modulation and Coding Scheme (MCS) of handheld user device 110 as well as estimate the handheld user device's path loss. The knowledge of the MCS can be used to infer channel quality, inasmuch as a handheld user device using a lower data rate MCS can be assumed to be experiencing poor channel quality, necessitating the use of that MCS (when the VML detects an MCS lower than an MCS threshold, that could indicate a desirability of activating the relay service). Similarly, channel quality is directly related to path loss, wherein the path loss of handheld user device 110 can be estimated by a signal strength received by the monitoring VML divided by the power control bits that have been sent to the handheld user device by access node 104.

By way of yet another example, VML 122 can estimate a signal quality in uplink transmissions by handheld user device 110, identified in the UL-MAP, by monitoring an associated pilot subcarrier (PUSC) that carries a channel quality indicator (CQI) (when the VML detects a CQI lower than a CQI threshold, that could indicate a desirability of activating the relay service). In still other examples, VML 122 may self-determine whether handheld user device 110 is receiving a signal from access node 104 of acceptable signal quality based on whether the VML detects any retransmission activity, or high retransmission activity, for the handheld user device (when the VML detects a retransmission rate higher than a retransmission rate threshold that could indicate a desirability of activating a relay service).

In response to determining that a relay service should be initiated, VML 122 activates 420 its relay service. Optionally, VML 122 optionally may wait until expiration of a waiting period before activating its relay service (for example, in response to detecting an opening of the vehicle door). When VML 122 activates its relay service, the VML selects a channel, band, or spectrum it will use for the short range VML-to-handheld user device link 118. For example, in one embodiment, VML 122 may determine to use a short range wireless protocol for the VML-to-handheld user device link 118, for example, may use Bluetooth® or may scan unlicensed spectrum and find a suitable band, such as a channel in the WiFi or the LTE-U (LTE in unlicensed bands) (for example, LTE-U900, that is, LTE-U in the 900 MHz band) spectrum. In another embodiment, where WAN 102 comprises a PS broadband or narrowband system and VML 122 is out of range of access node 104, the VML may choose to use a Public Safety WAN channel for VML-to-handheld user device link 118 and to use an available commercial cellular system for a VML-to-WAN link.

Upon finding suitable spectrum, VML 122 announces 422 to handheld user device 110 that a relay service is available, including a channel, band, or spectrum and the protocol selected for the VML-to-handheld user device link 118. For example, the VML may broadcast a message that includes an identifier of the VML and that identifies the channel, band, or spectrum it will use. In one such embodiment, this announcement may be done using a proximity service, such as the Third Generation Partnership Project (3GPP) ProSe service, which service is described in the 3GPP Technical Specification TR 22.803 v12.2.0. In such an embodiment, VML 122 may announce the availability of the relay service by broadcasting a ProSe Announcement that includes the VML's relay service information, such as contact and link information, available bandwidth, a number of handheld user devices being served by the VML/relay, access control information, and the time when the VML activated the relay service. An advantage of using ProSe is that ProSe is designed to share spectrum with a 3GPP LTE WAN network and a PS broadband system can dedicate a small amount of bandwidth to proximity services to facilitate relay discovery and other useful services. While it is assumed that that the PS broadband service provides a ProSe-based proximity service, other means may be utilized herein which utilize other spectrum, such as the 900 MHz ISM (Industrial, Scientific, and Medical) band. In other embodiments, VML 122 may use a discovery service, such as a ad hoc network discovery protocol or a Bluetooth® discovery protocol, to announce its presence and availability to handheld user device 110, which discovery protocol may be modified to identify the channel, band, or spectrum that will be used if such information is not already available in the protocol.

In any case, when VML 122 announces that a relay service is available, the VML further may indicate, in the relay service information, a bit rate that the VML estimates it can provide over VML-to-WAN link 118. For example, the VML may determine this bit rate based on the signal strength of the WAN, an identifier of the channel, band, or spectrum the VML is using for the VML-to-WAN link, and the protocol that the VML is using over the proximity service.

In response to VML 122's announcement of the availability of the relay service, any mobile device, such as handheld user device 110, within range of the VML's announcement may register 424 with the VML for the relay service by conveying a registration message to the VML that identifies such a mobile device. For example, handheld user device 110 may estimate the bit rate that the relay, that is, VML 122, can provide over the handheld user device-to-VML-to-WAN link (that is, links 118 and 107) based on signal quality metric measured for VML-to-handheld user device link 118 and the bit rate estimate of VML-to-WAN link 107 provided by the VML. The bit rate estimate can be determined as the minimum bit rate between the bit rate of VML-to-WAN link 107 and the bit rate of VML-to-handheld user device link 118. Handheld user device 110 may estimate the bit rate of the handheld user device-to-WAN link 118 as well and then may choose the link (that is, link 106 versus link 118/107) with the higher bit rate. That is, if the direct handheld user device-to-WAN link 106 provides a higher bit rate, then the handheld user device may ignore the relay service announcements of VML 122. Otherwise, if the handheld user device-to-VML-to-WAN link (that is, links 118 and 107) provides a higher bit rate, then the handheld user device may change to the channel, band, or spectrum indicated and protocol indicated by the announcement and register with VML 122.

In response to receiving the registration message, VML 122 may authorize the mobile device, that is, handheld user device 110 in this instance, to use the relay service and, upon successfully authorizing the handheld user device, acknowledge 426 the registration to the handheld user device. VML 122 and handheld user device 110 then may begin a data session, wherein the handheld user device conveys 428, 430 data to WAN 102, and in particular access node 104, via link 118, VML 122, and link 107, and access node 104 conveys 432, 434 data to handheld user device 110 via link 107, VML 122, and link 118.

VML 122 relays the data to and from handheld user device 110 on a different frequency and protocol that is used between the VML and WAN 102. The VML, when acting as a relay, may perform a Network Address Translation (NAT) function on the IP address and port number of the handheld user device and any other handheld user devices that may register to the VML's relay service, thereby acting as a proxy node for the handheld user devices using it as a relay. As a result, WAN 102 may only see the VML's mobile device identifier, such as an international mobile equipment identity (IMEI), and handheld user device 110 is effectively on a private local area network (LAN). In doing this, the handheld user device devices are only visible when they initiate contact with a network server. Most applications have some kind of keep-alive ping which will establish and maintain contact with a server so that the server can send unsolicited packets to the handheld user device.

When VML 122 determines 436 that the relay service is no longer needed, for example, when the VML determines that handheld user device 110 is receiving a signal from WAN 102 of acceptable signal quality signal, the PS responder (and corresponding handheld user device 110) has returned to vehicle 120, and/or vehicle 120 is moving, for example, driving away from the incident scene, the VML may terminate 438 the relay service. VML 122 then may announce 440 the termination of the relay service over short range link 118 and handheld user device 110 may attempt to register 442 on the WAN if it desires to continue the communication session. Signal flow diagram 400 then ends.

For example, and merely for the purpose of illustrating the principles of the present invention and not intending to limit the invention in any way, suppose a PS responder drives to an incident scene in a suburban or rural area. The vehicle is equipped with a 1.2 W VML with a 3 dBd roof-mounted antenna. The high power VML and gain antenna were chosen during the design phase of the WAN to reduce costs by increasing cells' size. When the PS responder arrives at the incident scene, he/she exits the vehicle and in so doing triggers the activation of the relay service of the VML. The PS responder's handheld user device has been unable to register with the WAN because its power and antenna gain is insufficient at its particular distance from the cell site. The VML announces that the relay service is available in the 900 MHz ISM using LTE-U900 and can provide 5 Mbps of throughput. The handheld user device changes to 900 MHz ISM and LTE-U900 and registers with the relay, that is, the VML, and begins transmitting data to the VML and receiving data from the VML over LTE-U900, which the VML relays to and from the WAN. When the PS responder gets back in the vehicle and drives away, the VML de-activates, that is, shuts down, its relay service and the handheld user device attempts to register on the WAN.

In another embodiment of the present invention, communication system 100 provides for a mediation, or negotiation, among multiple VMLs, such as VMLs 122 and 132, when the multiple VMLs converge on an incident scene and may act as relays. The multiple VMLs may decide if they enhance or hinder communications between the handheld user devices and the WAN before they activate their relay services; however, it is desirable that they decide quickly so that a first, in time, PS responder at the scene does not lack incident coverage. To address this, the multiple VMLs may communicate with each other via a proximity service at all times and, if a first VML, such as VML 122, receives an announcement for a relay service from another, second VML, such as VML 132, then the first VML may decide whether to activate its relay service when the conditions for activation described above are met.

In one such embodiment, a VML, such as VML 122, receiving a relay service announcement message from another VML, such as VML 132, will not activate its relay service if its relay service is not currently activated. If its relay service is currently activated, the VML/relay (as used herein, the term 'VML/relay' refers to a VML whose relay service is activated), for example, VML 122, may negotiate, through the proximity service and with other VMLs/relays, for example, VML 132, to elect a VML/relay that will maintain its relay service. The other, non-elected VMLs/relays then may deactivate their relay services. For example, each of the VMLs/relays may inform the other VMLs/relays of the number of handheld user devices that are being provided a relay service by the VML/relay and/or the signal quality of WAN signals measured by the VML/relay. The VML/relay maintaining its relay service then may be a VML/relay serving a largest number of handheld user devices, a VML with a longest established relay service, and/or a VML/relay having a best WAN signal quality metric, and the other VMLs/relays may or may not then de-activate their relay services. Each handheld user device then will register to that VML/relay, and might have to de-register at another VML/relay if a VML/relay currently serving the handheld user device has to shut down.

Figure 5A:
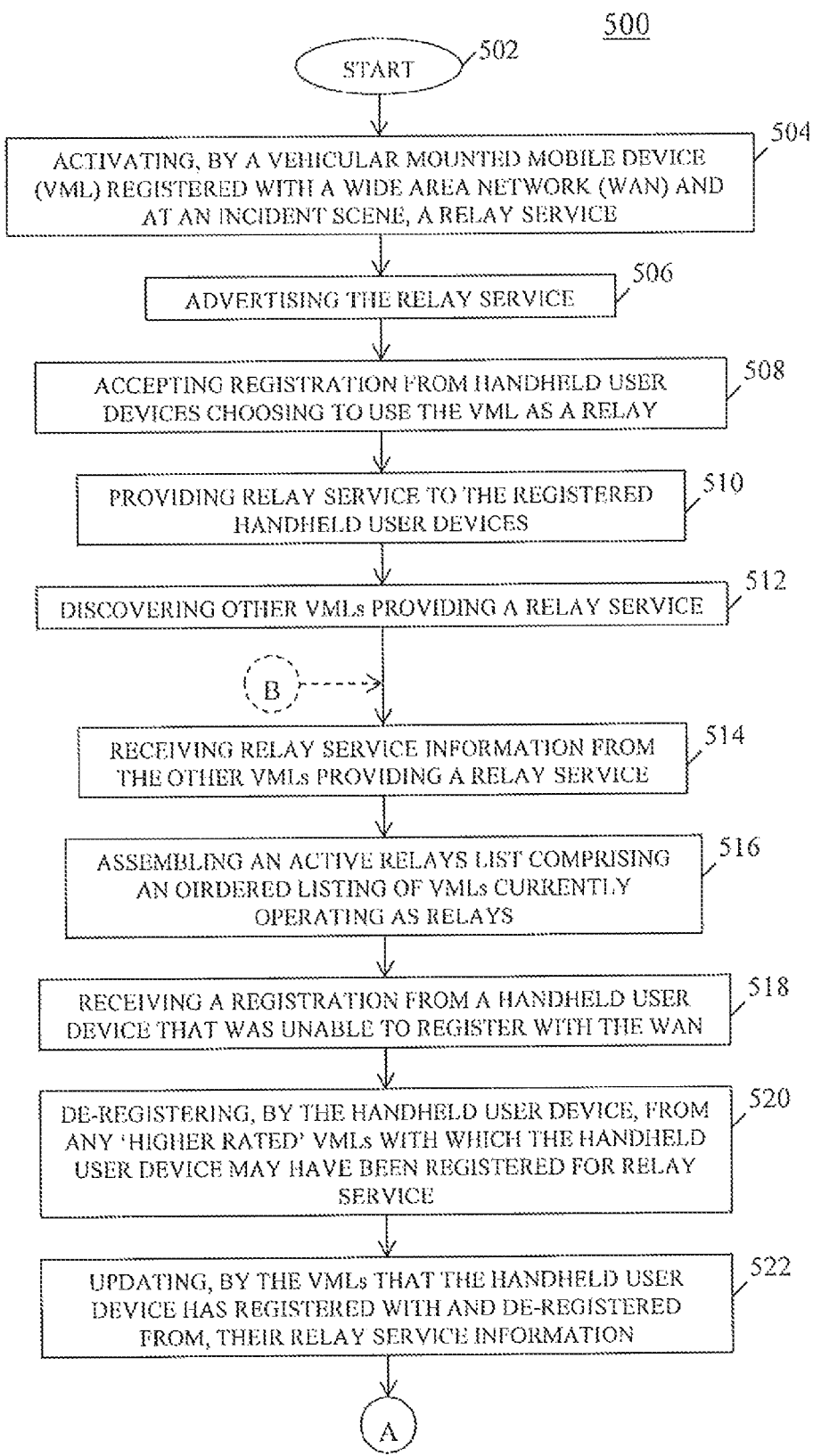
FIG. 5A is a signal flow diagram illustrating a mediation of multiple mobile devices converging on an incident scene and that may act as relays in accordance with some embodiments of the present invention.
Figure 5B:
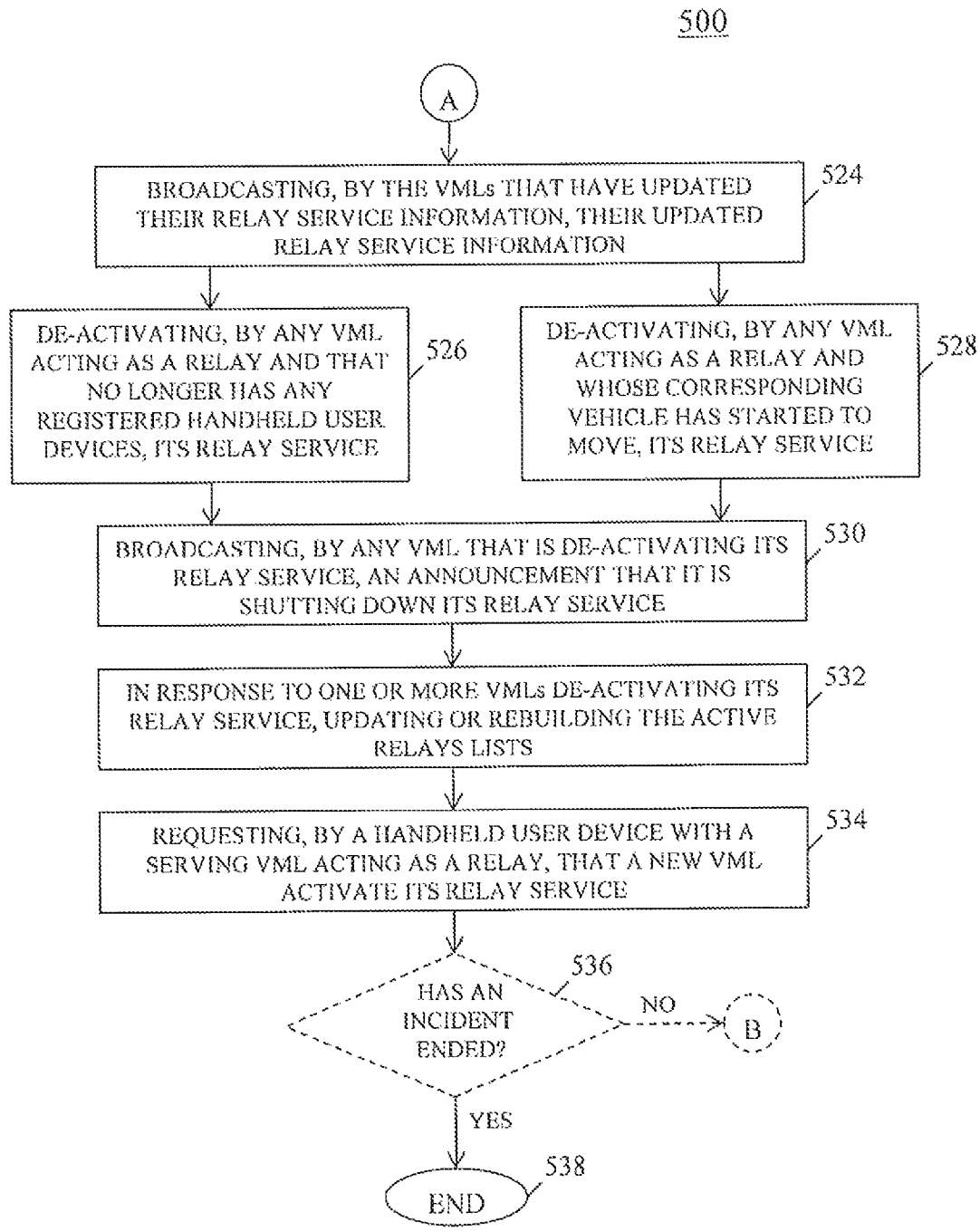
FIG. 5B is a continuation of the signal flow diagram of FIG. 5A illustrating a mediation of multiple mobile devices converging on an incident scene and that may act as relays in accordance with some embodiments of the present invention.

Referring now to FIGS. 5A and 5B, a logic flow diagram 500 is provided that illustrates a mediation of multiple VMLs, such as VMLs 122 and 132, converging on an incident scene and that may act as relays in accordance with some embodiments of the present invention. Logic flow diagram begins (502) when a first VML, such as VML 122, registered with WAN 102, activates (504) a relay service at an incident scene. VML 122 advertises (506) its relay service information, accepts (508) registration from any handheld user devices choosing to use its relay service, and starts providing (510) relay services to the registered handheld user devices on pre-determined, and/or on advertised, links. VML 122 (and, optionally, the handheld user devices) then may initiate a discovery (512) other VMLs acting as relays in a geographical area served by the VML by broadcasting a relay discovery inquiry, for example, a ProSe Inquiry, inquiring about other relays in the area.

Other VMLs/relays, such as a second VML 132, in the area that currently have activated relay services then may respond (514) to VML 122 with a relay discovery response, for example, a ProSe Announcement, that includes their relay service information, such as contact and link information, available bandwidth, a number of handheld user devices being served by the VML/relay, access control information, and the time when they last activated their relay service. Alternatively, or in addition, each VML/relay may autonomously and periodically broadcast a relay discovery response (for example, ProSe Announcement) that includes their relay service information, that is, even without receiving a relay discovery inquiry (for example, a ProSe Inquiry).

All mobile devices in the area, such as handheld user devices and VMLs, regardless of whether a VML's relay service is activated or not, may receive and interpret the relay discovery responses and assemble (516), that is, build and maintain in their at least one memory devices, a strictly ordered 'active relays list,' that is, a list of VMLs that are currently operating as relays. These lists then may be used to determine, for the VML/relays, an order in which they will be considered for deactivating the relay services. For example, in one embodiment, the fewer handheld user devices that are being provided relay service by a VML/relay, the VML/relay having a worst WAN signal quality metric, and/or the VML having most recently (in time) activated its relay service, the higher the VML/relay is in the list and the higher the probability that the relay service provided by that VML/relay will be deactivated.

When a handheld user device's attempt to register with a WAN fails, the handheld user device, such as handheld user device 110, then may attempt (518) to register with a lowest rated (in the active relays list) active VML/relay, for example, VML 122, that provides acceptable relay service, that is, that can provide a signal of acceptable signal quality to the handheld user device, acceptable bandwidth, an acceptable connection to the WAN, and access. If registration with the lowest (in the active relays list) active VML/relay is successful, the handheld user device then de-registers (520) from any higher rated, that is, 'higher in the active relays list,' active VML/relay with which the handheld user device is currently registered (for example, VML 132). In response to a successful (de)registration of handheld user device, each affected VML/relay (that is, VMLs 122 and 132) updates (522) its relay service information, for example, total remaining available bandwidth and number of served handheld user devices, to produce updated relays service information and broadcasts (524) its updated relay service information, for example, in subsequent ProSe Announcements.

When a VML/relay at the top of the list (for example, VML 132) loses all of its registered handheld user devices, the VML/relay deactivates (526) its relay service and broadcasts (530) an announcement that it is shutting down its relay service, for example, by broadcasting a ProSe Announcement indicating "relay shutting down." This announcement that it is shutting down its relay service also may be broadcast by a VML acting as a relay, regardless of handheld user device registrations, when the vehicle in which the VML is installed starts to move and/or leaves (528) the area. In response to one or more VMLs/relays de-activating their relay service, each VML may update its active relays list or may build a new list of active relays (for example, by use of the periodic announcements mentioned in step 514). For example, VMLs/relays at the top of the active relays list with (still or newly) registered handheld user devices then may temporarily move off the list until a new active relays list is built (532) (due to the periodic announcement mentioned in step 514). If a handheld user device ends up in need of, but without, a serving VML/relay, the handheld user device may use the ProSe Announcement mechanism to request (534) that a new VML activate its relay service. Steps 514-534 may be repeatedly continuously (with some time gaps between repetitions) until relay services are no longer needed, for example, when an incident ends. Logic flow 500 then ends (536).

Figure 6:
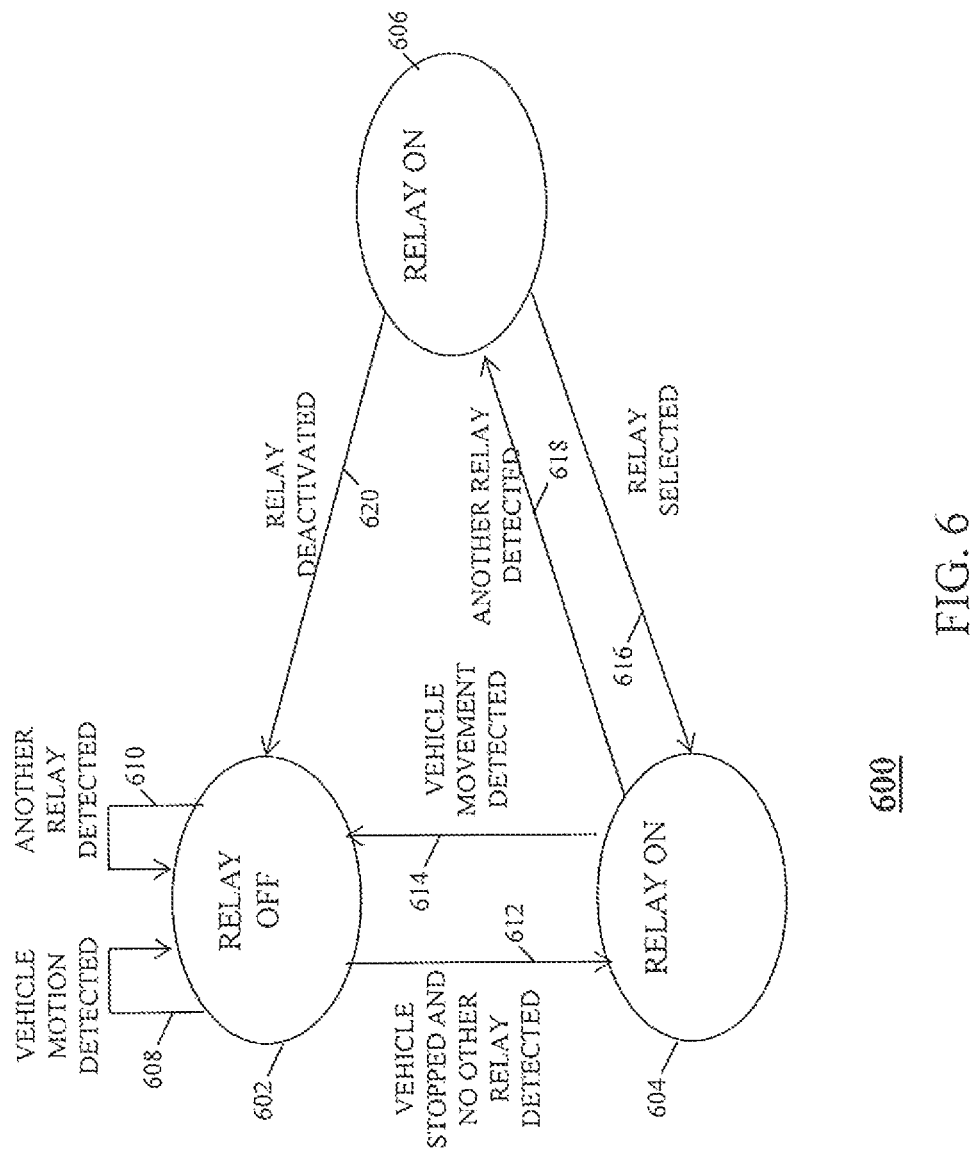
FIG. 6 is a state diagram illustrating an operation of a VML in accordance with some embodiments of the present invention.

Referring now to FIG. 6, a state diagram 600 is provided that illustrates an operation of a VML, such as VMLs 122 and 132, in accordance with some embodiments of the present invention. As depicted in FIG. 6, the VML may operate in at least three states, that is, an OFF state 602 wherein the VML's relay service is inactivated, a first ON state 604 wherein the VML's relay service is activated, and a transitional ON state 606 wherein the VML's relay service is currently activated and the VML is determining whether to keep its relay service on or to turn its relay service off.

When operating in OFF state 602, the VML may detect 608 a movement of vehicle 120, or may detect 610 another VML operating as a relay, and determine to keep the relay service inactivated, that is, the VML stays in OFF state 602. Further, when operating in OFF state 602, the VML may detect 612 that vehicle 120 has stopped and transition to ON state 604, that is, activate, or turn on, its relay service.

When operating in ON state 604, the VML may detect 614 a movement of vehicle 120 and transition to OFF state 602, that is, de-activate, or turn off, its relay service. Further, when operating in ON state 604, the VML may detect 618 another VML operating as a relay and transition to transitional ON state 606, wherein the VML then determines whether to stay on or turn off its relay service as described in greater detail with respect to FIGS. 4, 5A, and 5B. If, after transitioning to transitional ON state 606, the VML determines to keep its relay service on, that is, activated, the VML transitions back to ON state 604. However, if after transitioning to transitional ON state 606, the VML determines 620 to turn its relay service off, that is, to, de-activate its relay service, then the VML transitions to OFF state 602.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for managing a relay service in a public safety wireless communication system, the method comprising:
    determining, at a second mobile device, a first mobile device is not receiving a signal from a wide area network of acceptable signal quality;
    activating a relay service at the second mobile device;
    in response to activating the relay service, announcing, by the second mobile device, an availability of the relay service at the second mobile device;
    in response to announcing the availability of the relay service, receiving, by the second mobile device, a registration of the first mobile device for the relay service;
    in response to receiving the registration, relaying, by the second mobile device, communications between the first mobile device and an access node;
    wherein determining that the first mobile device is not receiving a signal from a wide area network (WAN) of acceptable signal quality comprises:
    determining a strength of a signal received by the second mobile device from the WAN; and
    based on the determined strength of the signal, estimating a strength of a signal received by the first mobile device from the WAN.

2. The method of claim 1, wherein the second mobile device is a vehicular mobile mounted device (VML) and the first mobile device is a handheld user device.

3. The method of claim 1, wherein relaying, by the second mobile device, communications between the first mobile device and an access node comprises:
    communicating, by the second mobile device with the first mobile device, over a short range wireless link; and
    communicating, by the second mobile device with the access node, over a wide area network wireless link.

4. The method of claim 1, wherein announcing, by the second mobile device, an availability of the relay service at the second mobile device comprises:
    broadcasting an announcement using a proximity service.

5. The method of claim 1, further comprising:
    determining, by the second mobile device, to terminate the relay service; and
    in response to determining to terminate the relay service, announcing, by the second mobile device, the termination of the relay service.

6. The method of claim 5, wherein determining to terminate the relay service comprises determining one or more of:
    the first mobile device has returned to the public safety vehicle;
    the public safety vehicle is moving; or
    the first mobile device is receiving a signal from a wide area network of acceptable signal quality.

7. An apparatus for provision of providing a relay service in a public safety wireless communication system, the apparatus comprising:
    a vehicular mobile mounted device (VML) comprising:
    a first network interface that is configured to directly communicate with a mobile device;
    a second network interface that is configured to directly communicate with an access node;
    a processor that is configured to:
    determine a mobile device is not receiving a signal from a wide area network of acceptable signal quality;
    activate a relay service at the VML;
    in response to activating the relay service, announce an availability of the relay service at the VML;
    in response to announcing the availability of the relay service, receive a registration of the mobile device for the relay service;
    in response to receiving the registration, relay communications between the mobile device and an access node via the first and second network interfaces;
    wherein the processor is configured to determine that the mobile device is not receiving a signal from a wide area network (WAN) of acceptable signal quality by determining a strength of a signal received by the vehicular mobile mounted device (VLM) from the WAN and estimating a strength of a signal received by the mobile device from the WAN based on the determined strength of the signal.

8. The apparatus of claim 7, further comprising one or more sensing devices that are configured to provide an indication of whether a user of the mobile device has exited or is exiting the public safety vehicle.

9. The apparatus of claim 7, wherein the first network interface is configured to communicate with the mobile device over a short range wireless link and wherein the second network interface is configured to directly communicate with the access node over a wide area network wireless link.

10. The apparatus of claim 7, wherein the processor is configured to announce an availability of the relay service at the vehicular mobile mounted device (VML) by:
    broadcasting an announcement using a proximity service.

11. The apparatus of claim 7, wherein the processor is configured to:
    determine to terminate the relay service; and
    in response to determining to terminate the relay service, announce the termination of the relay service.

12. The apparatus of claim 11, wherein the processor is configured to determine to terminate the relay service by determining one or more of:
    the mobile device has returned to the public safety vehicle;
    the public safety vehicle is moving; or
    the mobile device is receiving a signal from a wide area network of acceptable signal quality.

* * * * *